United States Patent
Chai et al.

(10) Patent No.: US 11,676,024 B2
(45) Date of Patent: Jun. 13, 2023

(54) LOW PRECISION NEURAL NETWORKS USING SUBBAND DECOMPOSITION

(71) Applicant: SRI International, Menlo Park, CA (US)

(72) Inventors: Sek Meng Chai, Princeton, NJ (US); David Zhang, Belle Mead, NJ (US); Mohamed Amer, Brooklyn, NY (US); Timothy J. Shields, Houston, TX (US); Aswin Nadamuni Raghavan, Princeton, NJ (US)

(73) Assignee: SRI International, Menlo Park, CA (US)

( * ) Notice: Subject to any disclaimer, the term of this patent is extended or adjusted under 35 U.S.C. 154(b) by 1270 days.

(21) Appl. No.: 15/999,769

(22) PCT Filed: Feb. 24, 2017

(86) PCT No.: PCT/US2017/019417
§ 371 (c)(1),
(2) Date: Aug. 20, 2018

(87) PCT Pub. No.: WO2017/176384
PCT Pub. Date: Oct. 12, 2017

(65) Prior Publication Data
US 2019/0258917 A1       Aug. 22, 2019

Related U.S. Application Data

(60) Provisional application No. 62/299,029, filed on Feb. 24, 2016.

(51) Int. Cl.
*G06N 3/04*       (2023.01)
*G06N 3/084*     (2023.01)
(Continued)

(52) U.S. Cl.
CPC ............ *G06N 3/084* (2013.01); *G06F 18/00* (2023.01); *G06F 18/21* (2023.01); *G06F 18/24* (2023.01);
(Continued)

(58) Field of Classification Search
CPC ........ G06N 3/0454; G06N 3/08; G06K 9/527; G06K 9/6267
See application file for complete search history.

(56) References Cited

U.S. PATENT DOCUMENTS

2013/0151450 A1    6/2013    Ponulak
2013/0325765 A1    12/2013   Hunzinger
(Continued)

OTHER PUBLICATIONS

International Search Report and Written Opinion of International Application No. PCT/US2017/019417, dated Nov. 23, 2017, 8 pp.
(Continued)

*Primary Examiner* — Dzung D Tran
(74) *Attorney, Agent, or Firm* — Shumaker & Sieffert, P.A.

(57) ABSTRACT

Artificial neural network systems involve the receipt by a computing device of input data that defines a pattern to be recognized (such as faces, handwriting, and voices). The computing device may then decompose the input data into a first subband and a second subband, wherein the first and second subbands include different characterizing features of the pattern in the input data. The first and second subbands may then be fed into first and second neural networks being trained to recognize the pattern. Reductions in power expenditure, memory usage, and time taken, for example, allow resource-limited computing devices to perform functions they otherwise could not.

20 Claims, 12 Drawing Sheets

(51) Int. Cl.
*G06V 10/52* (2022.01)
*G06F 18/00* (2023.01)
*G06F 18/21* (2023.01)
*G06F 18/24* (2023.01)
*G06F 18/2413* (2023.01)
*G06N 3/045* (2023.01)
*G06V 10/764* (2022.01)
*G06V 10/82* (2022.01)
*G06N 3/082* (2023.01)
*G06N 3/086* (2023.01)
*G06N 3/044* (2023.01)

(52) U.S. Cl.
CPC ......... *G06F 18/2413* (2023.01); *G06N 3/045* (2023.01); *G06V 10/52* (2022.01); *G06V 10/764* (2022.01); *G06V 10/82* (2022.01); *G06N 3/044* (2023.01); *G06N 3/082* (2013.01); *G06N 3/086* (2013.01)

(56) References Cited

U.S. PATENT DOCUMENTS

| | | | | |
|---|---|---|---|---|
| 2014/0081895 | A1* | 3/2014 | Coenen | G06N 3/049 706/25 |
| 2015/0324686 | A1* | 11/2015 | Julian | G06N 3/08 706/25 |
| 2016/0096270 | A1* | 4/2016 | Ibarz Gabardos | B25J 9/163 901/3 |
| 2016/0328644 | A1* | 11/2016 | Lin | G06N 3/084 |

OTHER PUBLICATIONS

International Preliminary Report on Patentability from International Application No. PCT/US2017/019417, dated Sep. 7, 2018, 7 pp.

\* cited by examiner

LOW PRECISION NEURAL NETWORKS USING SUBBAND DECOMPOSITION

CROSS REFERENCE TO RELATED APPLICATIONS

This application claims the benefit of U.S. Provisional Patent Application Ser. No. 62/299,029 filed on Feb. 24, 2016 and entitled "Low Precision Neural Networks Using Subband Decomposition." The disclosure of the provisional patent application and the references cited therein are hereby incorporated by reference.

STATEMENT REGARDING FEDERALLY SPONSORED RESEARCH

This invention was made with government support under FA9453-15-C-0056 awarded by the United States Air Force. The government has certain rights in the invention.

FIELD OF THE INVENTION

The invention relates generally to deep artificial neural networks, and more specifically, to use of input data decomposed into subbands, lower-precision weights, and/or fusion of subbands to enhance training efficiency of neural networks suited for classification and other tasks.

BACKGROUND

Artificial neural networks (ANNs) use a computational approach loosely based on biological brains and their use of interconnected neurons to process inputs. ANNs are typically organized in layers made up of interconnected nodes associated with activation functions. An input layer may receive an input, hidden layers may process the input via a system of weighted connections, and an output layer may provide a result. Deep neural networks (DNNs) include multiple hidden layers between the input and output layers. Large-scale DNNs have been successfully used in a number of tasks, such as image recognition and natural language processing. They are trained using large training sets on large models, making them computationally and memory intensive. There is much interest in DNNs capable of faster training and test time.

It is well understood in the deep learning community that to capture the wide spectrum of low, mid, and high-level representations for deep semantic understanding of complex patterns, networks with many layers, nodes, and with high local and global connectivity, are needed. The success of recent deep learning algorithms (e.g., in processing speech, vision, and natural language) comes in part from the ability to train much larger models on much larger datasets than was previously possible. One fundamental challenge, however, is that, as the dataset size sequences increases, the degree of non-linearity that is involved increases exponentially. This makes it more difficult to capture complex spatiotemporal dependencies, and thus impacts efficiency, training time, and performance.

Over the last decade, DNN parameter sizes have continued to grow dramatically. In 1998, the LeNet-5 Convolution Neural Net (CNN) used one million (M) parameters to classify handwritten digits. The AlexNet CNN used 60 M parameters to win the ImageNet image classification competition in 2012. To provide perspective, for automatic recognition of one thousand (K) categories of objects in the ImageNet dataset, this DNN has seven layers, supporting 65K neurons and 630 Msynaptic connections. We estimate 3K gigaflops per second, assuming 512×512 images at 100 gigaflops per frame. More recently, a DNN referred to as Deepface used 120 M parameters for human face verification, and there are other networks with 10 billion or more parameters. It has been estimated that 12.8 Watts would be required just for DRAM (dynamic random-access memory) access for a DNN with one billion connections, and such power and memory size requirements exceed the budget for a typical mobile device.

SUMMARY

In exemplary versions, input data is decomposed into subbands with differing information content (such as different characterizing features of patterns in the input data). The decomposition can be based on, for example, the type of data and patterns to be recognized therein. The subbands can be fed with different weights to a neural network for training of a neural network with multiple hidden layers. For example, bits for the weights and activations in the neural network may be allocated at different levels of precision, and can be varied at the subband level or at the layer level, such that the overall neural network is trained using fewer bits. The subbands may be fused at different stages during the training of the neural network. The number of parameters, and thus the computational and memory resources, may be significantly reduced over conventional approaches. This approach on subband decomposition is orthogonal and can be used together with other methods to obtain additional improvements. For example, data decomposition separates the energy or information content, and can work in conjunction with data augmentation for additional training benefits. Further advantages and features of the invention will be apparent from the remainder of this document, which discusses various exemplary implementations, in conjunction with the associated drawings.

The foregoing and other aspects and advantages of the invention will appear from the following description. In the description, reference is made to the accompanying drawings that form a part hereof, and in which there is shown by way of illustration preferred versions of the invention. Such versions do not necessarily represent the full scope of the invention, however, and reference is made therefore to the claims and herein for interpreting the scope of the invention.

DETAILED DESCRIPTION

DNNs are typically over-parameterized in that there is significant redundancy in the learning model. While the sparsity of the learned representations may offer DNNs higher algorithmic performance, it is easy to arrive at a DNN that is wasteful with respect to computational and memory resources. Recent research efforts have started to address DNN size and complexity. Some of these efforts are motivated by the need to reduce training time (e.g., down from weeks of processing time on large server clusters), and also from a desire to migrate DNNs to small, low power mobile processors. One difficulty is striking a suitable balance in which DNN sparsity (and therefore robustness and algorithm performance) is maintained without over-parameterizing the model.

Figure 1:
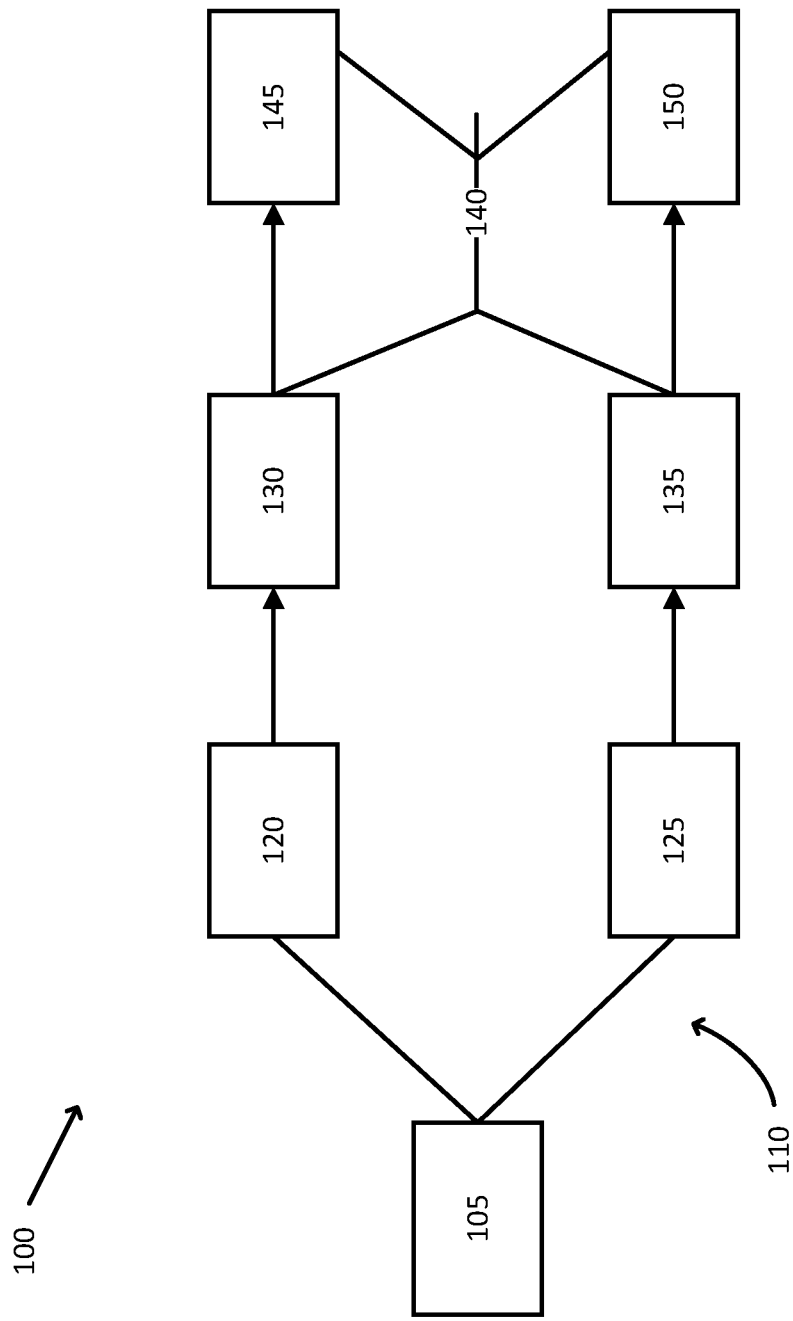
FIG. 1 depicts an exemplary version of a system in which input data is pre-processed before being fed to a neural network with multiple hidden layers, and outputs therefrom fused at different stages.
Figure 2:
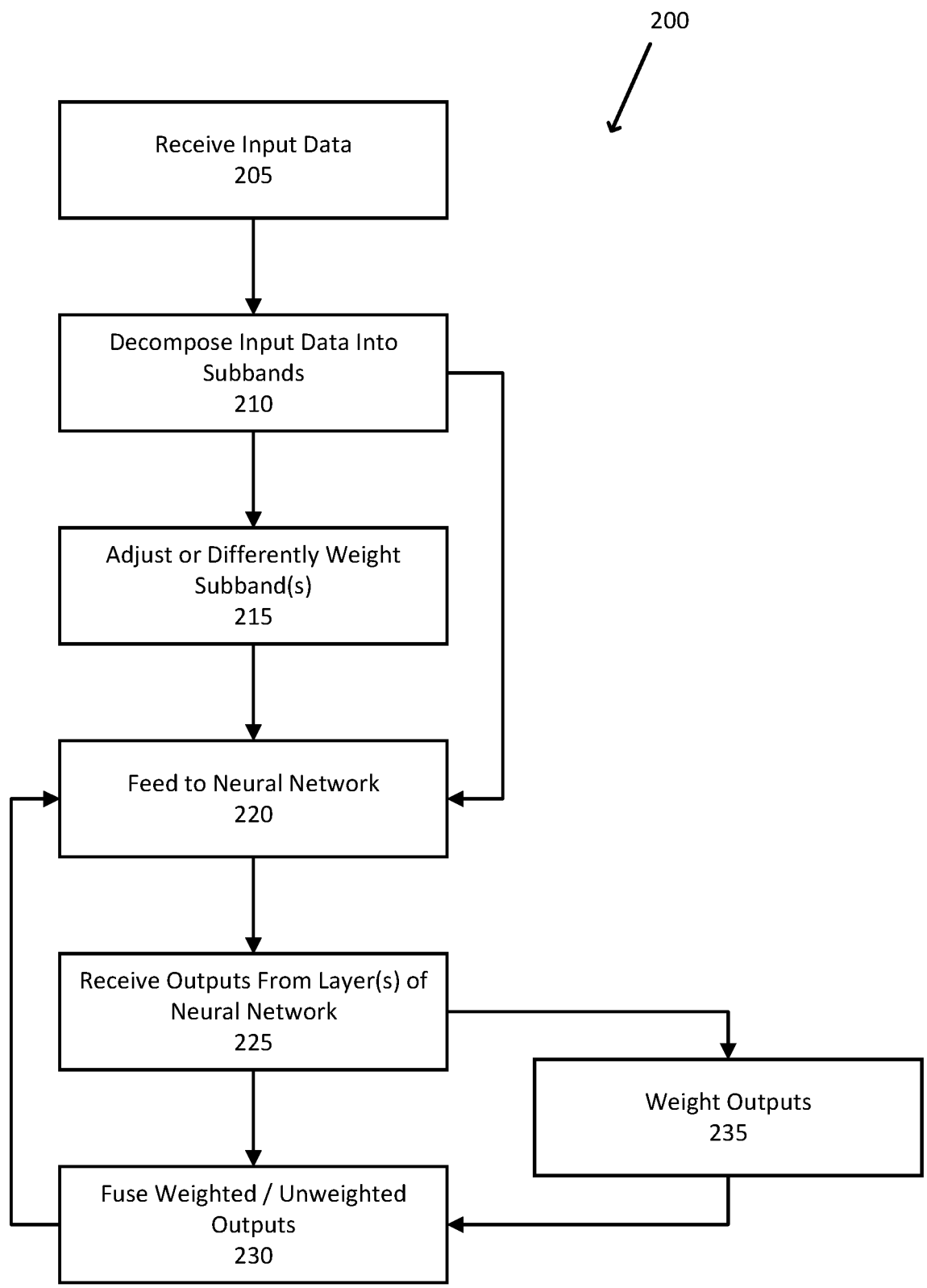
FIG. 2 provides an exemplary process corresponding with the exemplary configuration depicted in FIG. 1.

Referring to the exemplary system 100 and exemplary process 200 in FIGS. 1 and 2, respectively, an exemplary configuration begins by receiving input data 105 (205). The input data 105 may include, for example, patterns to be identified, deciphered, or recognized, such as handwritten text, faces, voice recordings, etc. The input data may be decomposed into, for example, first subband 120 and second subband 125 via decomposition 110 (210). The input data 105 may be decomposed, based on the content or type of input data, so as to achieve subbands that emphasize different aspects of the patterns to be recognized. That is, the manner in which the subbands are decomposed may be selected so as to achieve some differentiation in the characteristic features of the pattern contained in each subband. The differences between the subbands may be a basis for assigning different weights to the neural network during further processing of the subband of data.

The subbands may be obtained, for example, by filtering or decomposing the input data 105 based on frequency. For example, sharp transitions in pixel information may represent an edge captured in a higher-frequency subband, whereas textures may be repeating patterns captured in lower-frequency subbands. Similarly, frequency bands may be relevant to audio and speech recognition. For example, speech is comprised of sounds (phonemes) that are often characterized based on frequency or pitch, and different characteristics of the phonemes may thus be partitioned using frequency bands. First subband 120 may thus emphasize (i.e., include relatively more information on), for example, edges of objects in an image or video sequence, and the second subband 125 may emphasize, for example, textures and colors. Such decomposition can involve partitioning or separating the input data based on principal components, without necessarily discarding any of the input data. Other numbers (greater than two) of subbands may be chosen depending on the input data and the relevant application. For example, additional subbands may be used when there are additional principal components that define the patterns being trained to detect on the neural network.

The subbands 120, 125 may be adjusted or weighted differently by, for example, being allocated fewer bits (for example, to store the weights and activations of the neural network) during training (215). For example, if digits are to be recognized in input data 105, fewer bits may be used for a subband corresponding with textures and colors because they are not as relevant (as edges) to recognizing, for example, handwritten digits or infrared imagery. The number of bits allocated to subbands 120, 125 need not be the same as each other, or the same as a neural network trained with just the original data 105. For example, assuming a neural network that is trained on the input data 105 may be 32 bits, and the first subband 120 may be allocated 16 bits and the second subband 125 may be allocated 8 bits, this tends in effect to give priority or preference to the higher-bit first subband 120 over the lower-bit second subband 125 in such a configuration. Optionally, the number of bits of the subbands 120, 125 may be such that they sum to the number of bits of the neural network trained only on input data 105; for example, if the input data is 32 bits, the subbands can be allocated 24 and 8 bits so as to sum to 32.

The first and second subbands 120, 125 may then be fed into layers (or sets of layers) 130, 135, 145, 150 of the neural network to be trained (220). That is, subbands 120, 125 could be fed into relatively front-end layer(s) 130, 135, and then fed into deeper layer(s) 145, 150. The outputs of DNNs 130, 135 (225) may, in certain implementations, be fused (230) into output 140, which can be fed to one or more subsequent layers in the neural network (220) if, for example, the fused output 140 is more suitable for further processing by one or more layers. Layers (e.g., 145, 150) may thus receive as inputs the unfused outputs from a previous layer (e.g., 130, 135), or a fused output (such as 140) from the previous layer. The fusion process may optionally involve weighting (235) of results to emphasize or deemphasize the outputs of one or more layers. It is noted that deeper neural networks can be formed with additional layers in a configuration similar to 145 and 150, wherein the inputs can be fused or unfused outputs. It is also noted that recurrent neural networks can be formed such that the output 140 is fed to an earlier layer, forming a loop, in subsequent layers similar to those of layers 145 and 150. It is understood that neural networks for the subbands can be trained separately in time, and can be combined or fused at different times in process 230.

It is noted that bit precision can be adjusted on a layer-by-layer basis (such that a different number of bits is allocated to different layers), and need not be maintained at the same level for every layer of a neural network. For example, the front-end or forward layers of a network may be involved in feature extraction (e.g., identifying lines and circles), and the deeper layers may be classifiers involved in combining identified features (orientation, assembly) to achieve semantic-level characterizations. It may be advantageous to allocate fewer bits for relatively less demanding front-end feature extraction layers, and a greater number of bits to relatively more demanding subsequent semantic-level characterization layers. It is understood that trimming or otherwise adjusting bits (215) is a relative terminology, such that the process 215 can be generically used to define a method to adjust the appropriate number of bits during training phase, if so desired, to achieve sufficient performance in pattern recognition. For example, the process 215 can be used to add additional bits to the subband in one specific layer, while simultaneously an overall number of memory for the network can be reduced (e.g., by reducing the number of parameters, nodes, and synaptic connections in the neural network).

It is also understood that the processes 215 and 230 may conclude that the specific subband may have substantially zero weighting, such that there are no important features in that subband that are required for pattern detection. For example, in process 215, the weights in layers 120 of the neural networks for the subband may be adjusted iteratively until it is substantially valued at zero, such that there is no contribution of the generated outputs from layers 120. In another example, in process 230, the weighted contribution from layer 130 might be adjusted iteratively in output 140 until it is substantially valued at zero, such that there is no contribution from layer 130 in the fused output 140. In certain implementations, to detect phonemes, processes 215 and 230 might result in substantially zero weights, indicating that there is no information content in that frequency band required to detect the phoneme. Having a zero weight contribution from a subband through processes 215 and 230 means that the neural network can be pruned by removing the elements of the neural network to result in a smaller sized network. Lower precision neural networks can thus be achieved by identifying subbands that have zero weight contributions through iterative evaluation using process 200. In this example, the neural network is pruned based on an analysis of the values of the weights, which are performed in process 200 for subbands.

The neural network width is one of the configurable parameters of the neural network. The width of a neural network defines how many features that can be trained in each subband and in each layer (e.g. 120 and 125), using resources and memory stored as weights in those layers. For example, in each subband, there might be multiple phonemes to detect and recognized in that frequency band, requiring a larger sized layer. In reference to the example of zero weight contributions resulting from processes 215 and 230, the neural network can further be pruned such that the width of a neural network layer (e.g. 120 and 125) is reduced. Lower precision neural network can thus be achieved by removing elements of the neural network in a layer having zero weight contributions. In this example, the neural network is pruned based on an analysis of the values of the weights, which are performed in process 200 for each layer in each subband of the neural network.

Parameters that may be adjustable include: (i) the decomposition method (filters, etc.) used to obtain the subbands from the input data, and the number of subbands; (ii) trimming of bits in the neural network processing the subbands by, for example, allocation of different number of bits for different subbands; (iii) weighting of results to be fused to emphasize or deemphasize subbands; (iv) the width of the neural network; (v) variation of precision at the layer level by allocation of a different number of bits for different layers, such as by tapering the number of bits going forward in the neural network such that the number of bits allocated for front-end or otherwise earlier layers is greater than the number of bits allocated to subsequent layers (or vice-versa); this allows precision to be a flexible parameter throughout the training process.

Figure 3:
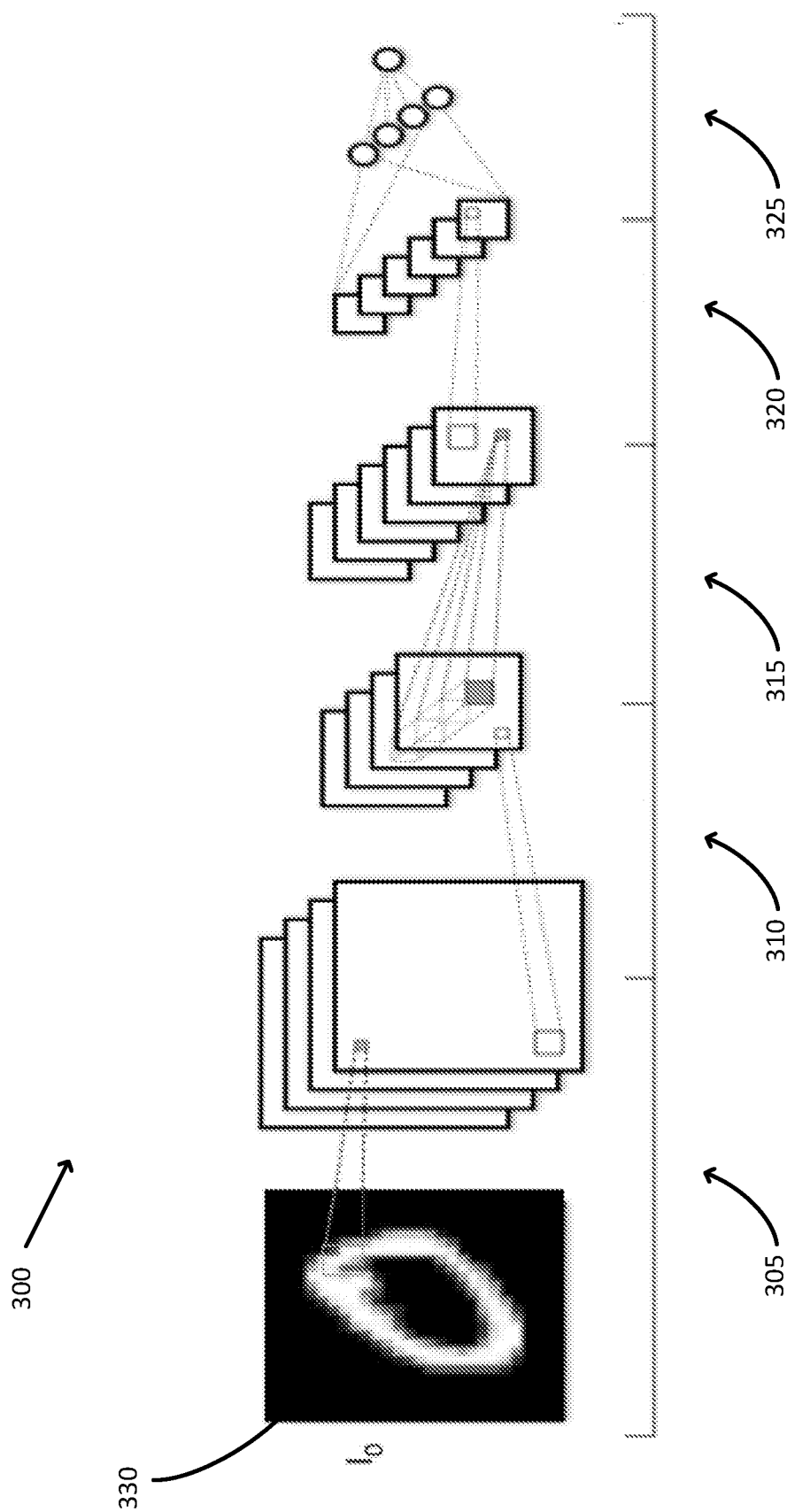
FIG. 3 depicts a LeNet-5 convolutional neural network (CNN) that was used in a study of an exemplary implementation of the invention.

To show the efficacy of an exemplary subband decomposition approach to low precision DNN, the LeNet-5 convolutional neural network (CNN) 300 depicted in FIG. 3 can be used as a DNN model. This LeNet-5 CNN 300 includes five layers comprising two convolutional layers 305, 315 with 5×5 filters and ReLU activation function. A pooling/subsampling layer 310, implementing the max pooling function over nonoverlapping pooling windows of size 2×2, follows each convolutional layer. The second pooling/subsampling layer 320 feeds into a fully connected multilayer perceptron (MLP) layer 325 with another ReLU layer, which is then connected into a 10-way softmax output layer. CNN 300 receives "original" or unaltered input image $I_o$ 330.

Figure 4A:
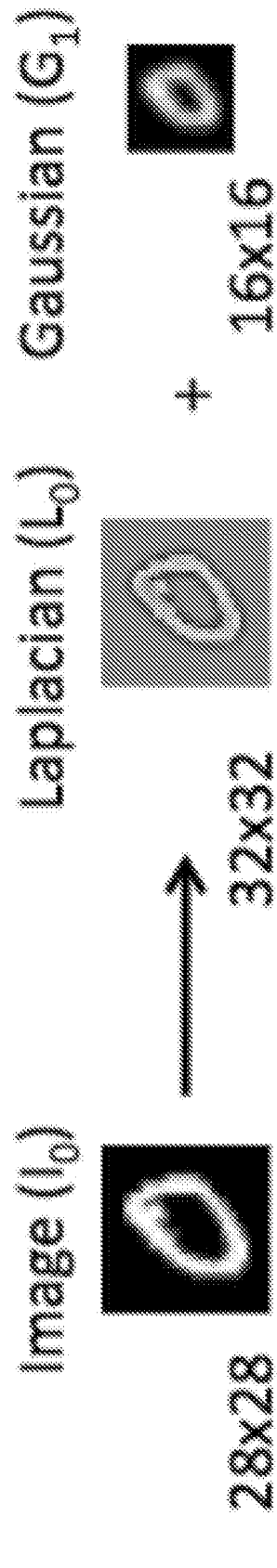
FIG. 4A depicts the decomposition of input data into two subbands, $L_0$ and $G_1$, using Laplacian and Gaussian filters, respectively.
Figure 4B:
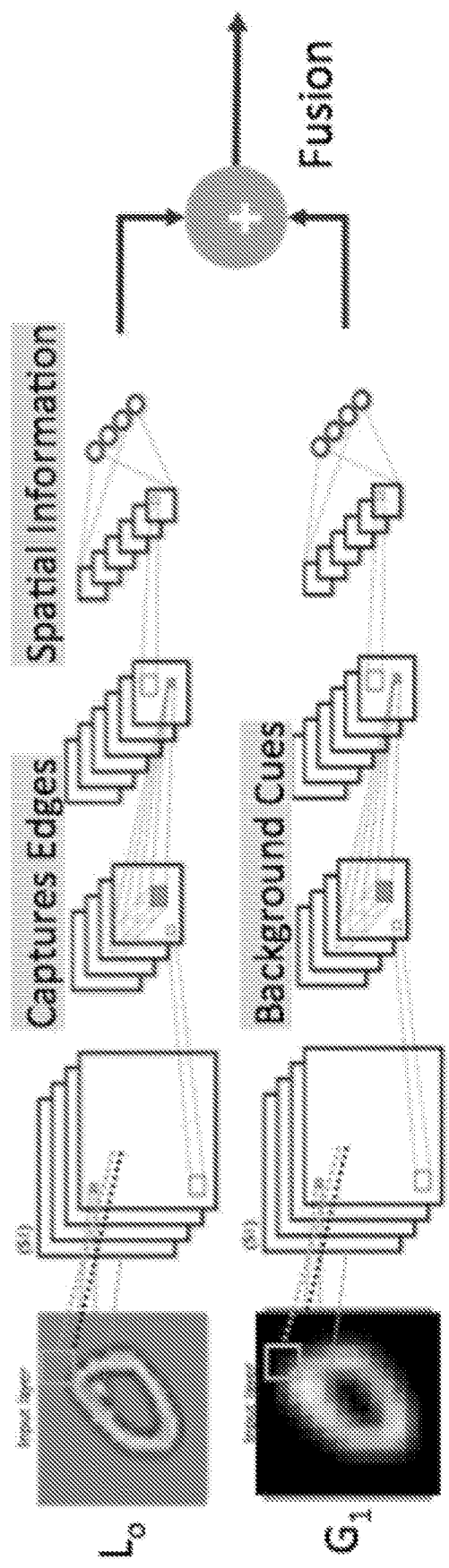
FIG. 4B depicts an exemplary deep neural network (DNN) architecture for the two subbands of FIG. 4A emphasizing edge and texture information.

FIGS. 4A and 4B illustrate an exemplary DNN architecture that processes decomposed input images. For this study, two subbands are shown, high and low, which are generated by Laplacian and Gaussian filters as depicted in FIG. 4A. When decomposed, the images represent edge and texture, respectively, and are labeled as $L_0$ and $G_1$. A subsampled representation of the Gaussian at half resolution was chosen. As shown in FIG. 4B, for each subband, we provide a DNN to learn the spatial and spectral features for that particular frequency band. We have chosen the same LeNet-5 CNN architecture for both subbands for simplicity in comparison, but the same architecture need not be used in different configurations. We provide a fusion stage during which results from each subband are combined. For this study, we choose a simple equation that provides an equi-weighted average of softmax output. This fusion stage may be a neural additional layer that is parameterized, but was not so for this study.

During training, the exemplary process seeks to maintain the overall network size as the original baseline design. This is achieved using stochastic rounding to trim the weights. Stochastic rounding is an unbiased rounding scheme with the desirable characteristic that the expected rounding error is zero. It is preferable to preserve the gradient information, statically over many training epochs. First, the range of weight coefficients is defined based on the target bit precision. Then we update the weights of each layer with SGD (stochastic gradient descent) in back-propagation. A default learning rate of 0.1 may be used, but the effect of different learning rates on this network will be further discussed below. The network can be trained using the back-propagation algorithm to set the weights of the neural network, based on the gradients of values of the weights. It is understood that there are additional training algorithms including but not limited to stochastic gradient descent (SGD) and genetic algorithms.

For this study, both MNIST and CIFAR-10 data were used to cover both edge specific and natural/color images. The MNIST database contains black and white handwritten digits, normalized to 20×20 pixel size. There are 60K training images and 10K testing images in MNIST. The CIFAR-10 dataset contains 60K 32×32 color images in 10 classes, with 6K images per class. There are 50K training images and 10K test images in CIFAR-10. Each of these images was prefiltered (using Laplacian and Gaussian filters) and fed into the exemplary DNN architecture. The baseline architecture uses only the original image (unaltered) in this study, and we do not perform any data augmentation so as not to influence the result with orthogonal approaches. The results are meant to be compared against the baseline and not against any competitive ranking for these benchmarks.

Figure 5:
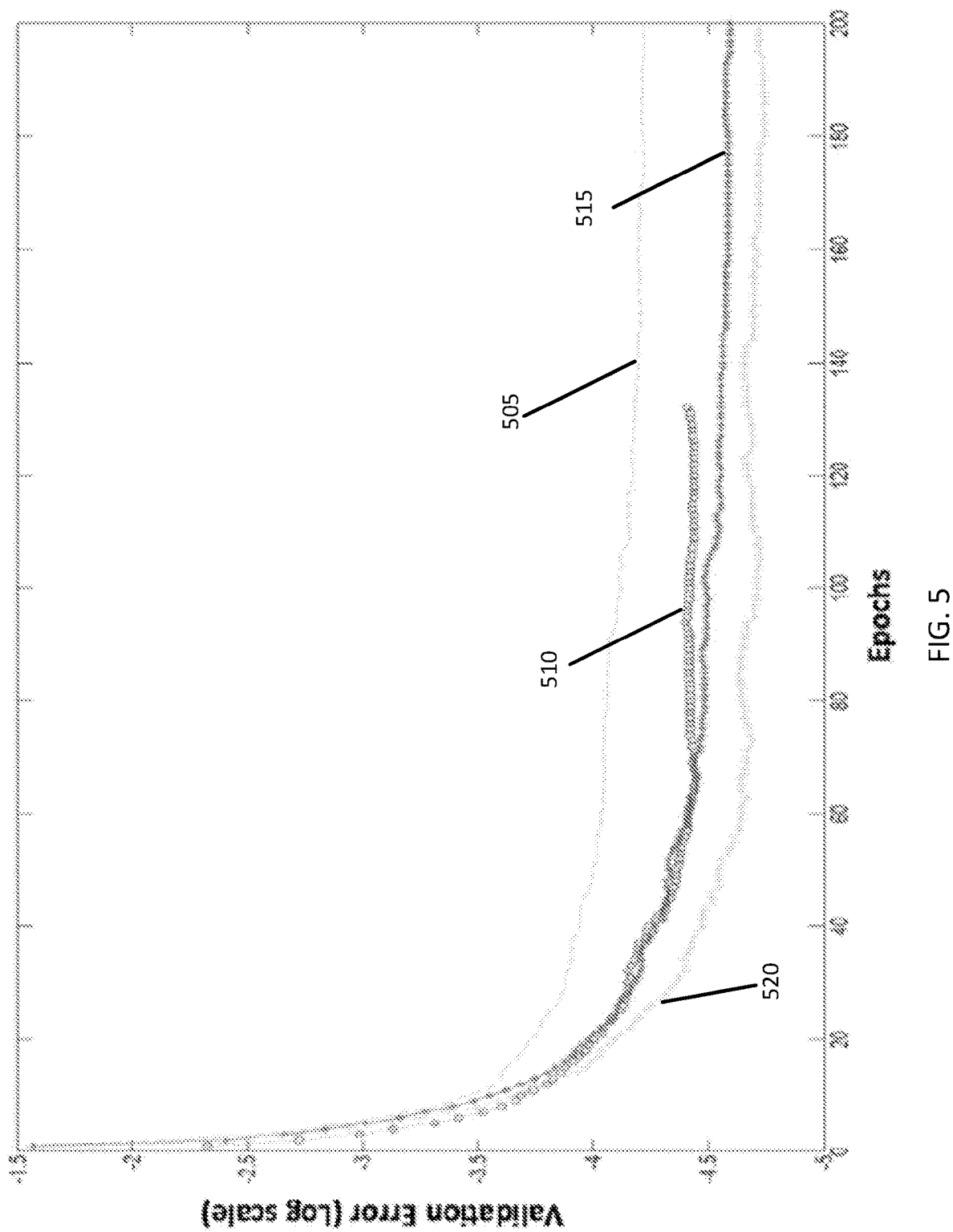
FIG. 5 illustrates performance of the DNN architecture of FIGS. 4A and 4B for the MNIST dataset (Mixed National Institute of Standards and Technology database), showing lower validation error for the fused $L_0+G_1$ result over baseline. Learning converges relatively quickly for the fusion approach, while learning for the original approach levels off.

FIG. 5 illustrates performance for the exemplary DNN architecture against baseline. Trace 505 ("---") corresponds with Gaussian $G_1$, trace 510 ("ooo") corresponds with original $I_o$, trace 515 ("xxx") corresponds with Laplace $L_0$, and trace 520 ("xxx") corresponds with fusion. The learning rate of the baseline DNN, shown using original Jo image, converges at a level between the $L_0$ and $G_1$ results. This is interpreted as follows. Because the MNIST dataset are digits, the $L_0$ network is able to better capture more salient feature for digit classification. $G_1$ network performs poorer because its input data are more texture oriented. Notably, the fusion of $L_0$ and $G_1$ results produce results that are 16% better. The results in FIG. 5 assume full 32-bit floating point for all networks. That is, the weights for $L_0$ and $G_1$ were not trimmed at this point. This is done intentionally to illustrate that the subband decomposition approach can result in better overall algorithmic performance. This is attributed to the subband decomposition's ability to separate features from "noise" from a learning perspective. That is, we are able to direct tune the learning for each subband, allowing the overall learning at a more optimal point.

Table 1 shows DNN performance for the MNIST dataset for different bit precisions. The top half of the table shows results when stochastic rounding is performed at the end of the training sequence. The bottom half of the table shows results when the stochastic rounding is performed after each epoch. It can be seen that fine grain guidance helps reduce the learning gradient and therefore the results are improved (in the bottom half of the table).

TABLE 1

| Weight bits | 32 bit | 16 bit | 8 bit | 4 bit |
|---|---|---|---|---|
| Stochastic Rounding After Final Epoch | | | | |
| Original | 1.13 | 1.22 | 1.14 | 4.45 |
| Gaussian blur | 1.38 | 1.34 | 1.35 | 5.24 |
| Laplace | 1.02 | 0.96 | 1.03 | 6.03 |
| Fusion | 0.89 | 0.91 | 0.92 | 6.03 |
| Stochastic Rounding After Every Epoch | | | | |
| Original | 1.13 | 1.13 | 1.11 | 1.32 |
| Gaussian blur | 1.38 | 1.41 | 1.36 | 1.38 |
| Laplace | 1.02 | 1.00 | 0.91 | 1.66 |
| Fusion | 0.95 | 0.89 | 0.89 | 1.33 |

With respect to precision, it is noted that the subband approach can reduce the bit precision by a half. The 32-bit baseline architecture can be scaled down to 8-bits before performance is affected at 4-bits. Similarly, the fusion exhibits the same behavior at 4-bits. However, at 4-bit precision, the fusion result is comparable or better than the 16-bit and 8-bit baseline. That is, fusion results are comparable to original, using half the number of bits. Stochastic rounding after every epoch guides the learning, and may be particularly useful for low precision.

Figure 6:
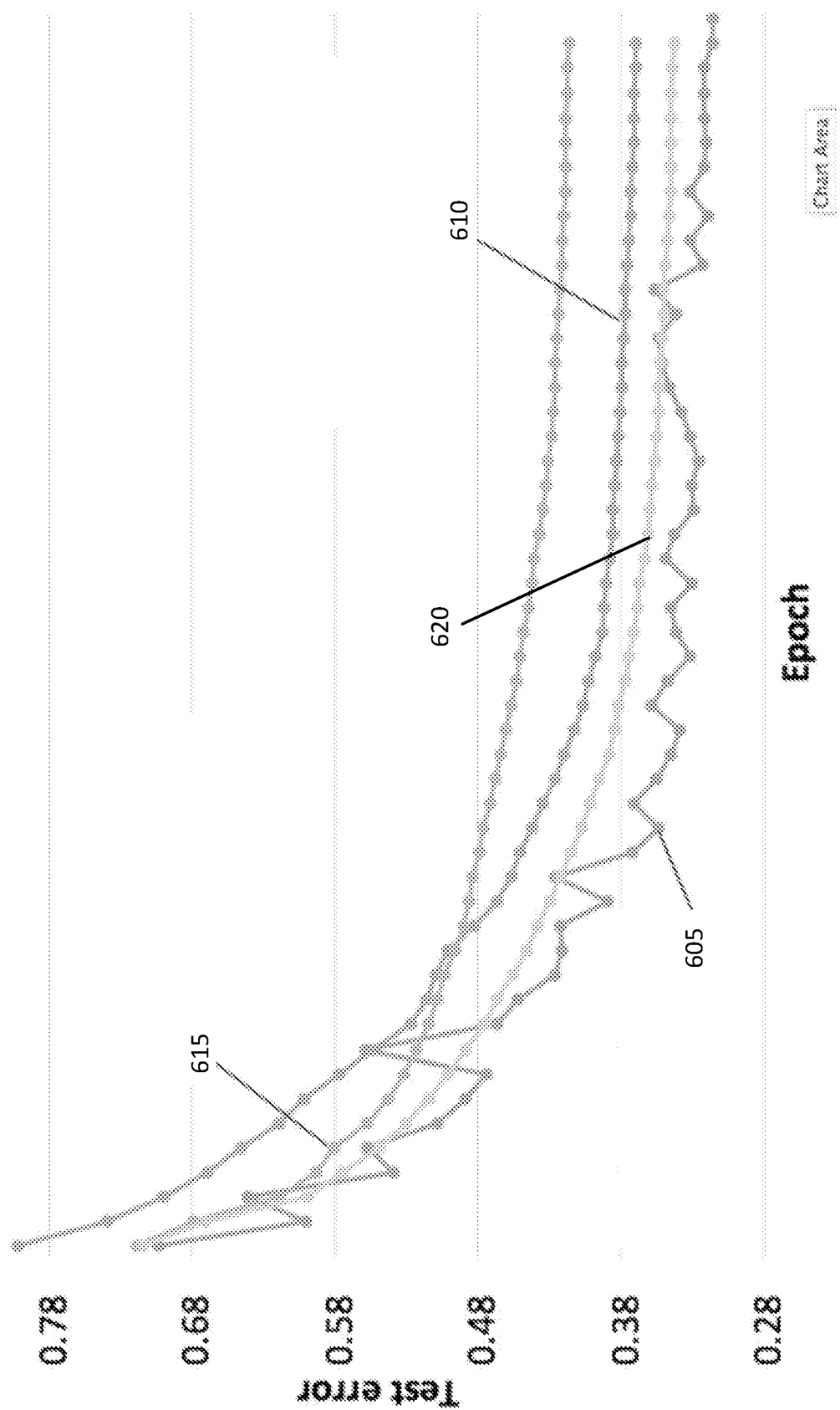
FIG. 6 shows performance of the exemplary DNN of FIGS. 4A and 4B for the CIFAR-10 dataset (https://www.cs.toronto.edu/~kriz/cifar.html), showing comparable test errors for the fused result over baseline.

FIG. 6 shows the results using the CIFAR-10 dataset. Trace 605 corresponds with original (cluttered image combined with high learning rate), trace 610 corresponds with Laplacian (which enhances foreground), trace 615 corresponds with Gaussian blur (which removes noise in clutter), and trace 620 corresponds with fusion. Here, it is noted that the $L_0$ and $G_1$ results have a crossover in performance during training, likely attributable to the nature of CIFAR-10 images as some of the images can be simply classified with color patches (e.g. airplane classes are easily distinguished from blue sky). The fusion results remain at par with the baseline results as they both converge similarly. It is also noted that there is oscillation of the results for the baseline in comparison to the fused results. This may be due to the variation of features in the original $I_o$ images. Just as in the MNIST data, this is likely attributable to the ability of the subband approach to separate features from "noise" from a learning perspective.

Figure 7:
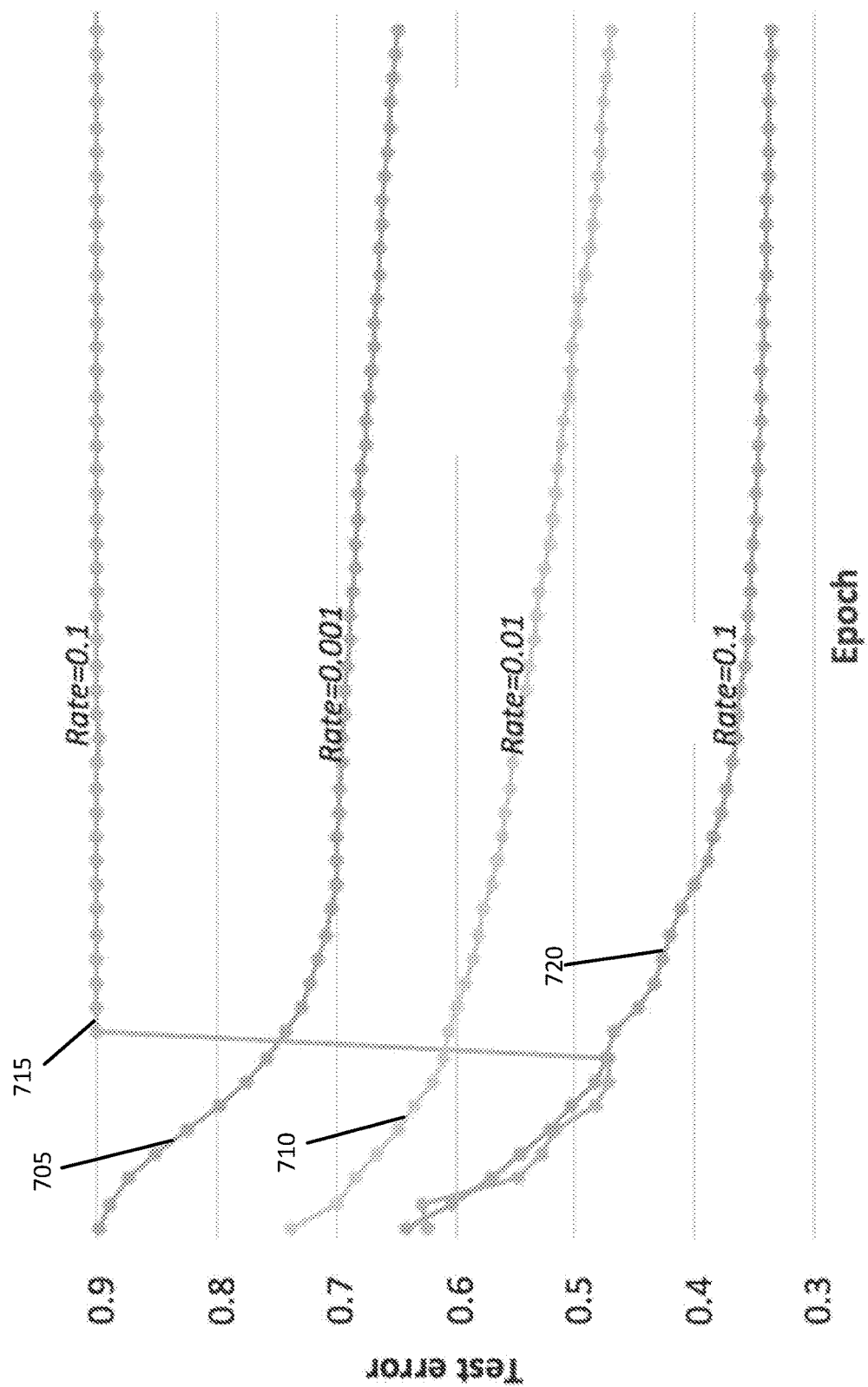
FIG. 7 illustrates the effect of learning rate on test errors, showing the stability of fusion results at a higher learning rate of 0.1, for the exemplary DNN architecture of FIGS. 4A and 4B.

To better illustrate the learning stability, the effects on different learning rates were explored. In FIG. 7, trace 705 corresponds with original with 1K hidden nodes with a learning rate of 0.001, trace 710 corresponds with original with 1K hidden nodes with a learning rate of 0.01, trace 715 corresponds with original with 1K hidden nodes with a learning rate of 0.1, and trace 720 corresponds with fusion with 1K hidden nodes with a learning rate of 0.1. As shown in FIG. 7, the original baseline DNN can converge in a stable manner at lower learning rates (0.001 and 0.01, corresponding with traces 705 and 710, respectively). However, at a rate of 0.1 (corresponding with trace 715), the DNN may be at a tethering at a stability point. In comparison, the fusion results shows stable learning at the rate of 0.1 (corresponding with trace 720). In this experiment, the hidden layers were increased to 1K neurons to dramatically highlight this behavior. The anticipated influence is that the subband approach can afford a faster training time because the original baseline can be prone to stability issues with higher learning rates.

Figure 8:
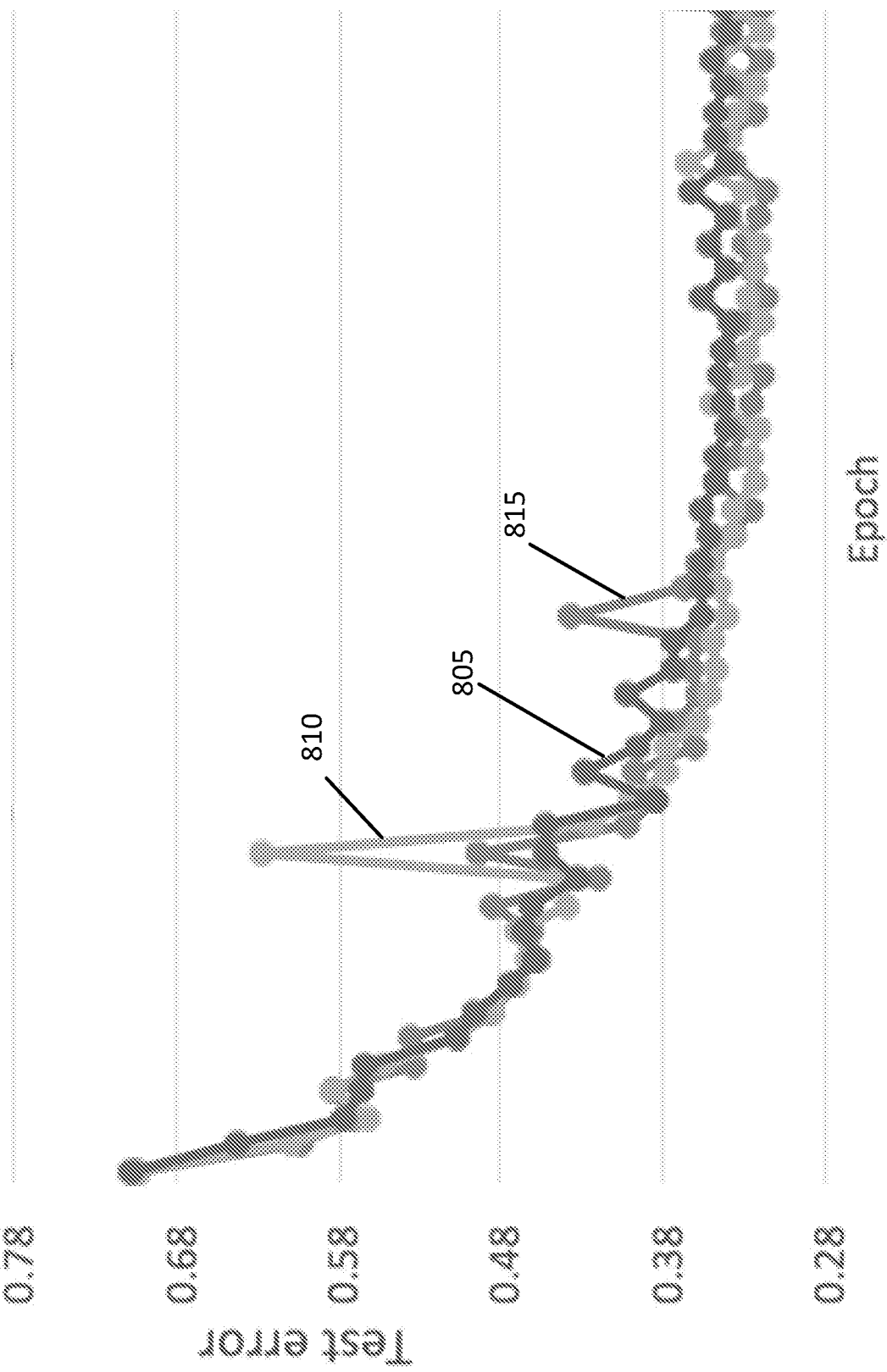
FIG. 8 illustrates baseline DNN performance for the DNN architecture of FIGS. 4A and 4B for the CIFAR-10 dataset, with varying bit precisions.
Figure 9:
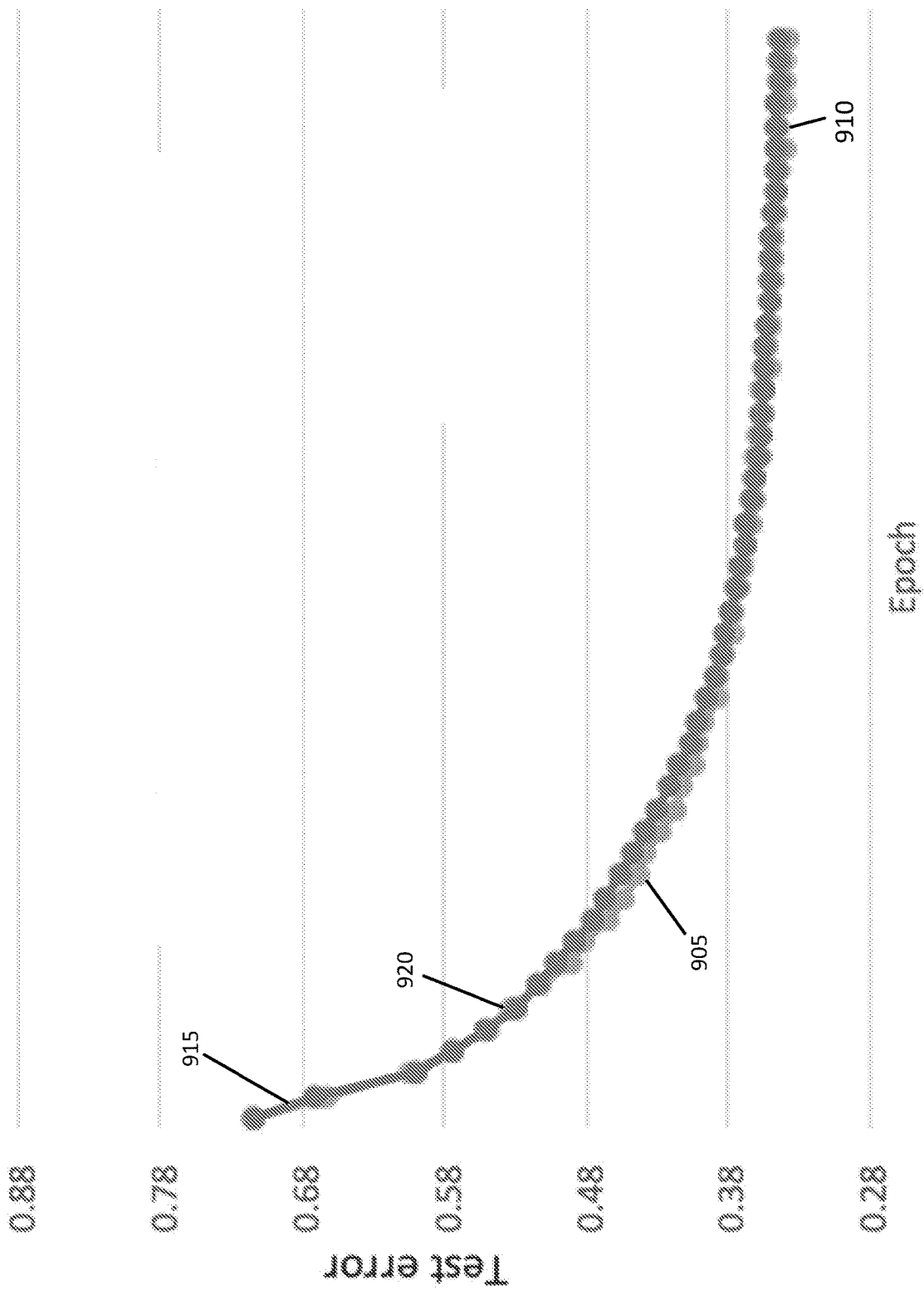
FIG. 9 illustrates subband DNN performance for the DNN architecture of FIGS. 4A and 4B for the CIFAR-10 dataset, with varying bit precisions.

FIGS. 8 and 9 depict the DNN performance for the CIFAR-10 dataset for different bit precisions. In FIG. 8, trace 805 corresponds with original, 4-bit floating point, trace 810 corresponds with original, 8-bit floating point, and trace 815 corresponds with original, 16-point floating point, all original. (The trace corresponding with 32-bit floating point is included, but not separately visible due to overlap with the traces shown.) In FIG. 9, trace 905 corresponds with fusion, 4-bit floating point, trace 910 corresponds with fusion, 8-bit floating point, trace 915 corresponds with fusion, 16-bit floating point, and trace 920 corresponds with fusion, 32-bit floating point. Both baseline and subband converge to a similar level. It was previously noted that the oscillating results in baseline results are due to the higher learning rate. It is also noted that algorithmic performance is similar for precision from 32-bit to 4-bit for both baseline and subband approach. Moreover, with a conventional approach, performance can deteriorate with rounding. In contrast, the fusion approach may be more resilient to lowering precision and can converge more smoothly. The fusion approach can thus be leveraged for stable learning, and scale to lower precision.

Figure 10:
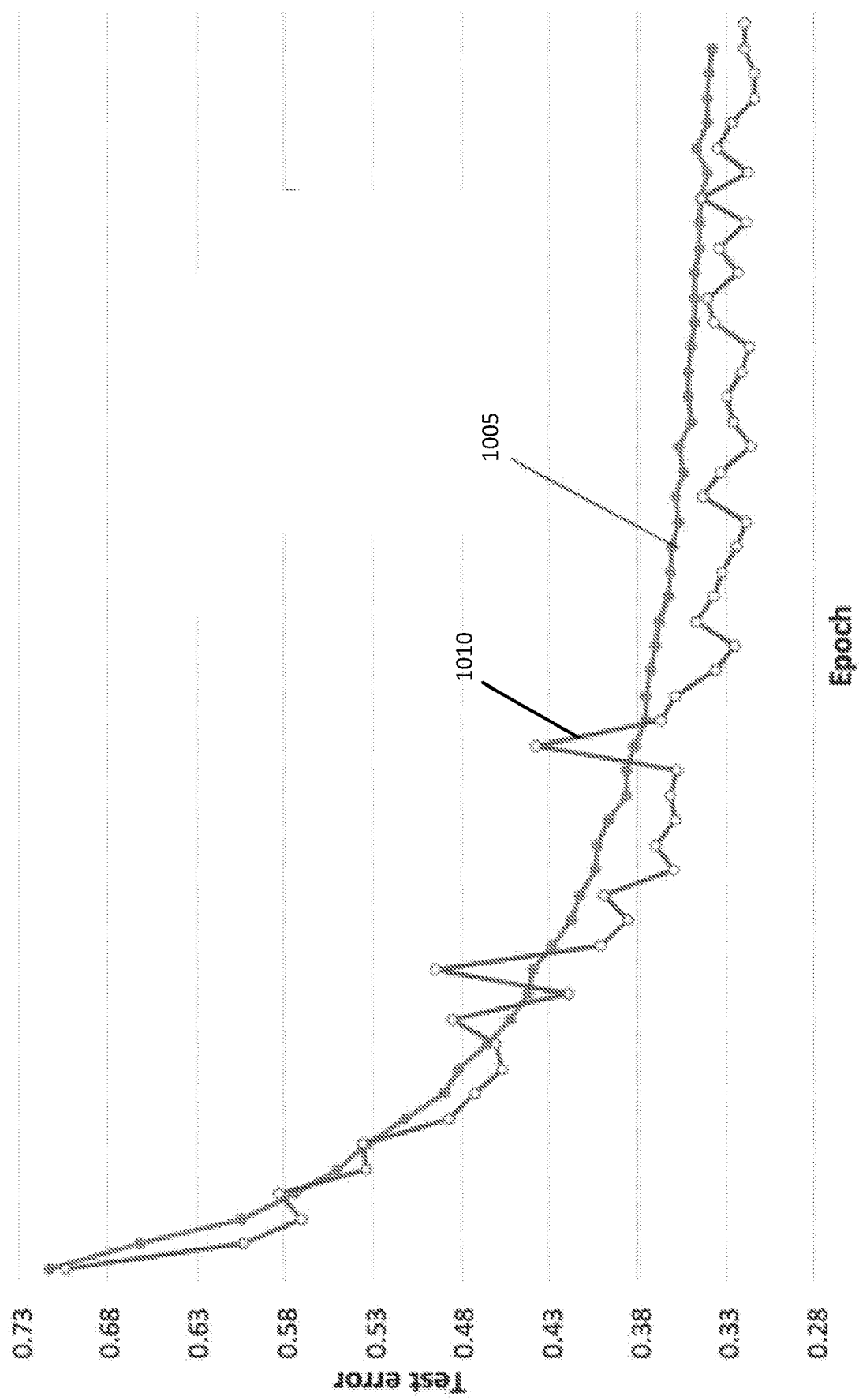
FIG. 10 illustrates that stable learning is achieved by subband decomposition (fusion) even at lower precision (4-bit versus 32-bit) weights.
Figure 11:
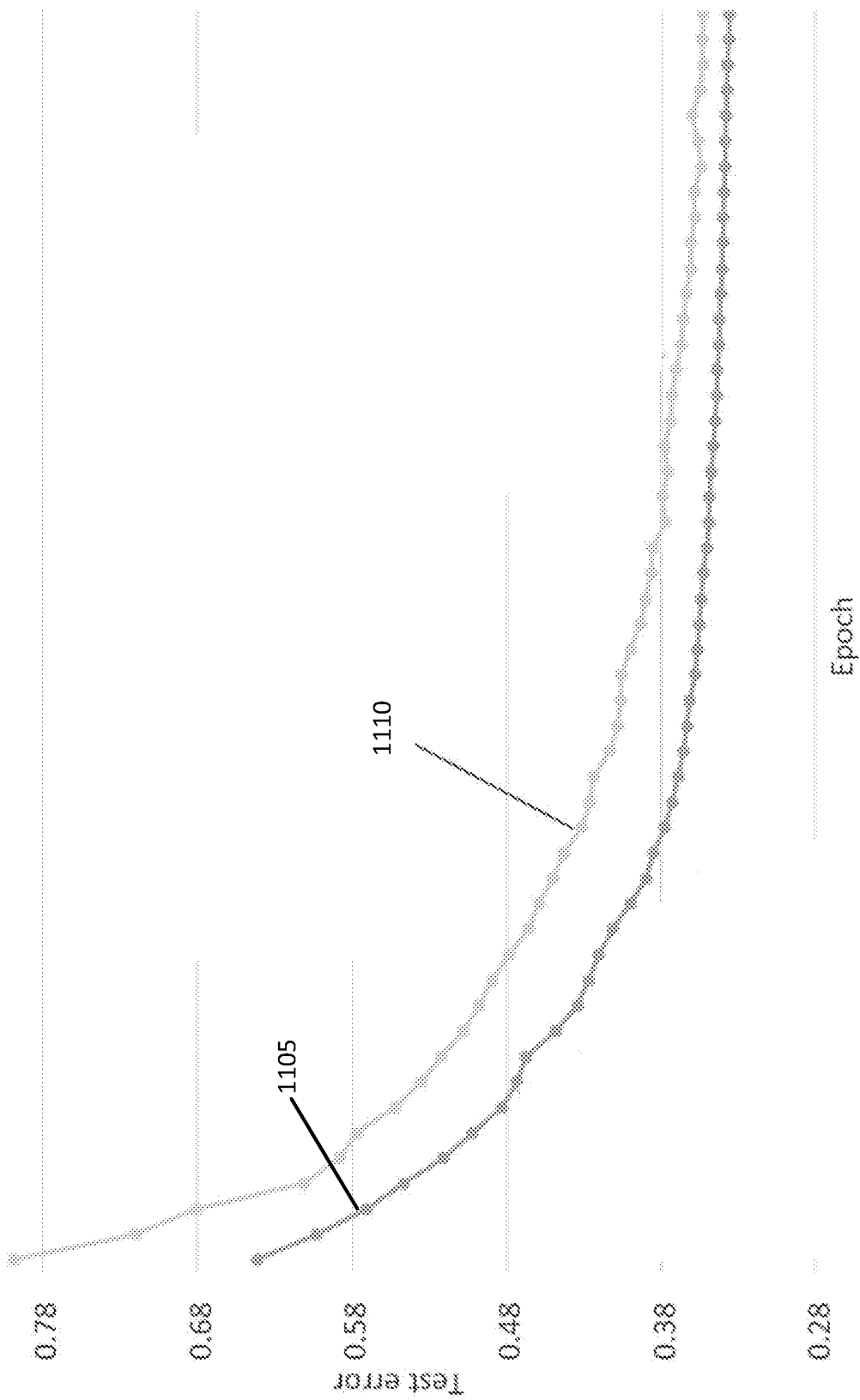
FIG. 11 illustrates a reduction in architectural parameters in the exemplary DNN of FIGS. 4A and 4B.

It is noted that learning stability may be an important factor, and that the subband approach supports both lower precision and stable learning, at similar learning rates. As shown in FIG. 10, comparing 4-bit fusion (1005) with baseline 32-bit (1010), this desired characteristic is demonstrated against a more erratic baseline result. With respect to the fused subband network, the largest size network (32-bit floating point, with 1K hidden units) uses 11.7 M parameters, while the smallest size network (4-bit floating point with 50 hidden units) uses only 0.68 M parameters. This amounts to a 17× reduction in parameters while maintaining stable learning and comparable performance. That is, the fusion approach can support lower precision and stable learning at similar learning rates. Referring to FIG. 11, the test error rate is shown for the largest fusion 1105 (32-bit floating point, with 1K hidden units) as compared with the test error rate for the smallest fusion 1110 (4-bit floating point, with 50 hidden units). The largest fusion 1105 corresponds with 11.7 M parameters and 357 MBits, while the smallest fusion 1110 corresponds with 0.68 M parameters and 2.58 Mbits. Here, the fusion approach is potentially learning more specific features when noise in training data is better separated.

Figures 12A, 12B:
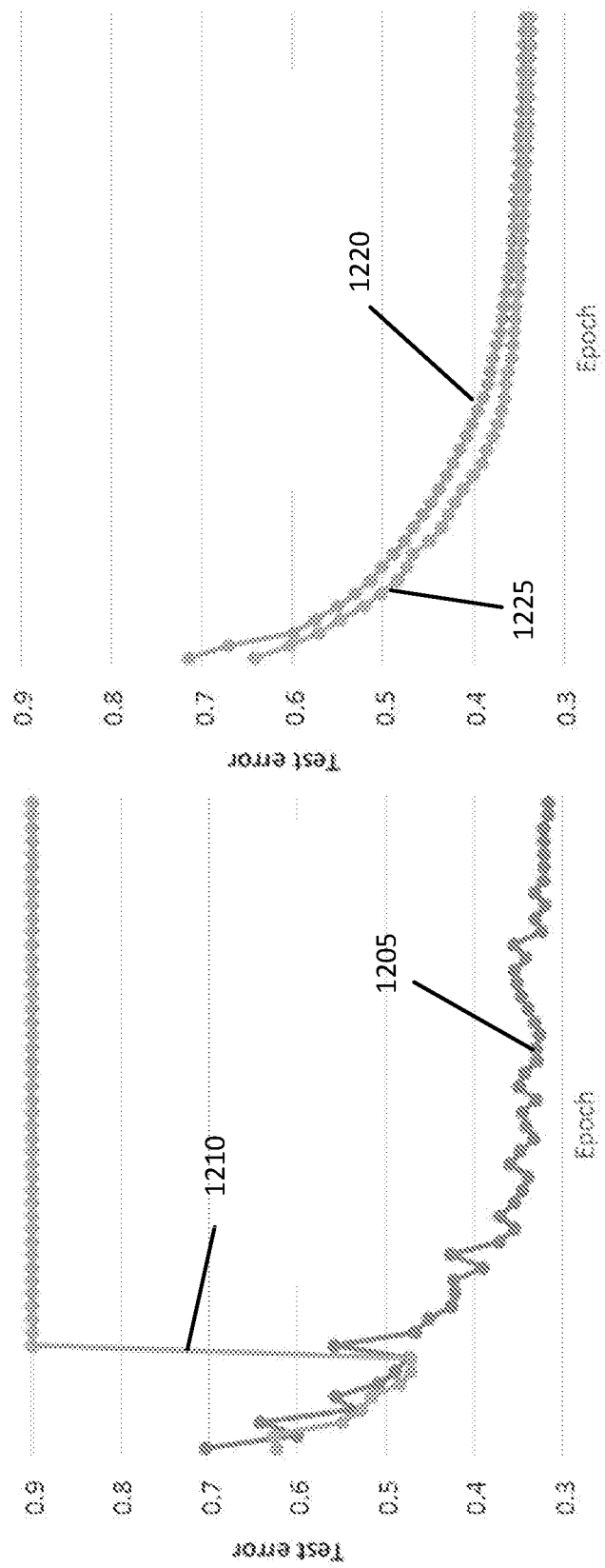
FIG. 12A compares original with 250 hidden units, and original with 1K hidden units, both at a learning rate of 0.1.
FIG. 12B compares fusion with 250 hidden units, and fusion with 1K hidden units, both at a learning rate of 0.1

FIGS. 12A and 12B illustrate robustness of exemplary implementations to hidden units for the CIFAR-10 dataset. In FIG. 12A, trace 1205 corresponds with original plus 250 hidden units with a learning rate of 0.1, and trace 1210 corresponds with original plus 1K hidden units with the same learning rate of 0.1. In FIG. 12B, trace 1220 corresponds with fusion with 250 hidden units with a learning rate of 0.1, and trace 1225 corresponds with fusion with 1K hidden units with the same learning rate of 0.1. Increasing hidden nodes with large learning rates can result in overfitting. Advantageously, the fusion approach appears more resilient to learning noise and can converge more smoothly. We can thus increase the number of hidden nodes with lower precision, and use the fusion approach for stable learning.

The study explored the notion of decomposing an image into different subbands in order to arrive at a more optimal DNN learning. This characteristic helps in achieving better classification results (per the MNIST result), and/or more stable learning (per the CIFAR-10 result). The subband approach is presented as an alternative means to design lower precision DNN. One basic premise of various exemplary versions is that if each subband is more "optimal" from the learning perspective, we can better quantize and approximate the learning weights.

The present approach works orthogonally with stochastic rounding approach to lower precision. Other approaches, such as neural network pruning, can be combined with this approach to further improve performance. Traditional neural network pruning typically involves removal of synaptic connections between layers of the neural network based on a threshold (e.g. indicating the maximum number of synaptic connections) set for the entire neural network during training. State of the art results on MNIST and CIFAR-10 use specific data augmentation/conditioning. For example, linear operations such as translations and rotations of images, and noise removal via contrast stretching and ZCA whitening, have been used. Exemplary approaches discussed here use image decomposition (e.g., into subbands), and can complement data augmentation/conditioning methods. Without using any augmentation, a comparable performance is achieved.

A goal in developing the above systems and methods was to directly address the exponential growth in memory sizes for large DNNs by exploring new approaches that can accommodate low precision weights. Exemplary approaches discussed above do not take a binary or carte blanche application of simple truncation, rounding, or recasting of floating points to lower precision integers because the resulting DNN gradient estimates could have very high variance, and the overall learning would not converge. Instead, they offer a scalable approach for all layers of the network with reduced variance and precision loss in algorithmic performance. In exemplary configurations of the low-precision DNN, an image can be decomposed into different frequency bands, and opportunities to trim precision may be afforded before or after DNN learning. Such a method may better guide the DNN to learn particular features specifically, and from this more guided learning, precision can be trimmed with little or no loss in algorithmic performance. The efficacy of using this approach has been demonstrated, for example, for separating images into high and low frequency bands, and allowing DNN to learn edge and textures separately. Much like lossy compression of images, precision reduction can be justified based on removal of learn representation that is not needed for the image recognition task. In the compression domain, the term wavelets are used analogously as subbands, and similarly the same terminology can be used in the low precision DNN approach.

In certain implementations of the low-precision DNN, hundreds of subbands are trained to detect patterns specific to those subbands, resulting in a more optimized neural network with higher algorithmic precision, using less memory, and able to be trained in less time. That is, a higher number of subbands can achieve better performance, lower memory use, and easier training. Such a capability is afforded by the approaches discussed above because the separation of principal components, described earlier, allows for optimization of individual neural networks in each subband.

Other approaches are orthogonal and can be used together to obtain additional improvements. The application of decomposition in exemplary systems uses pre-processing of input data into different subbands, which differs from data augmentation, in which images are rotated, mirrored, and contrast adjusted, in order to generate sufficient variation of the original images for training. Data decomposition is a process that separates the energy or information content, and can work in conjunction to data augmentation for additional training benefits.

Alternative versions may be provided with an additional network layer where the weighted precision can be learned. In other configurations, Gabor filters (instead of, or in addition to, the Laplacian/Gaussian filters discussed above), which are more biologically inspired, may be used for decomposition. If non-linearity in certain color transformation from RGB may not be easily learned, the prefiltering step may help the DNN learn important features to improve its algorithmic performance. The various versions discussed above may be implemented in hardware, software, or any combination thereof. For example, a hardware implementation may utilize field-programmable gate array (FPGA) hardware to delineate the memory and power efficiency gains offered by the subband decomposition approach.

Exemplary versions of the systems and methods discussed above provide a significant improvement in the functioning and operation of computing devices using neural networks. By reducing power consumption, memory requirements, and time taken to train neural networks, resource-limited computing devices (such as mobile phones and tablets) can accomplish more than they could otherwise. For example, requiring 12.8 Watts just for DRAM access for a DNN with one billion connections, would leave such operations out of reach for mobile devices. DNN training can require, for example, weeks of processing time on large server clusters, and cannot be migrated to small, low power mobile processors. In exemplary configurations, such migration can be achieved while suitably maintaining DNN robustness and performance.

It is noted that the above approach is applicable to neural networks generally, and is not limited to particular types of neural networks. For example, in alternative configurations, recurrent neural networks may be used. The precision and weight for the recurrent (feedback) connections can be set in a similar fashion. In various implementations, multiple subbands of neural networks, where each neural network can be a recurrent network, may be used. It is further noted that learning the weighting function for fusion may involve interpreting the weights as number of bits. The system may dynamically learn bits according to fusion error.

The present invention has been described in terms of one or more preferred versions, and it should be appreciated that many equivalents, alternatives, variations, additions, and modifications, aside from those expressly stated, and apart from combining the different features of the foregoing versions in varying ways, can be made and are within the scope of the invention. Exemplary configurations can be implemented using hardware, software, single integrated devices, multiple devices in wired or wireless communication, or any combination thereof.

EXAMPLES

Illustrative examples of the technologies disclosed herein are provided below. An embodiment of the technologies may include any one or more, and any combination of, the examples described below.

In an example 1, an artificial neural network system implemented by one or more computers is configured to receive input data that defines a pattern to be recognized, decompose the input data into a first subband and a second subband, wherein the first and second subbands include different characterizing features of the pattern in the input data, and feed the first and second subbands into first and second neural networks being trained to recognize the pattern.

An example 2 includes the subject matter of example 1, wherein the processor is configured to decompose the input data based on frequency.

An example 3 includes the subject matter of example 1 and/or 2, wherein the input data is decomposed using at least one of a low-pass filter, a high-pass filter, a Laplacian filter, a Gaussian filter, and a Gabor filter.

An example 4 includes the subject matter of example 1, 2, and/or 3, wherein the processor is further configured to adjust bit precision of the first and second neural networks during training based on the first and second subbands.

An example 5 includes the subject matter of example 1, 2, 3, and/or 4, wherein the processor is further configured to fuse the first and second neural networks being trained on the first and second subbands.

An example 6 includes the subject matter of example 1, 2, 3, 4, and/or 5, wherein the processor is further configured to feed the fused neural network into a subsequent hidden layer of at least one of the first and second neural networks.

An example 7 includes the subject matter of example 1, 2, 3, 4, 5, and/or 6, wherein the processor is further configured to feed the first and second neural networks trained on the first and second subbands into a subsequent hidden layer of at least one of the first and second neural networks.

An example 8 includes the subject matter of example 1, 2, 3, 4, 5, 6, and/or 7, wherein the fused neural network comprises a weighted average of the output of the first and second neural networks.

An example 9 includes the subject matter of example 1, 2, 3, 4, 5, 6, 7, and/or 8, wherein the pattern is a phoneme, and the subbands characterize at least one of frequency and pitch.

An example 10 includes the subject matter of example 1, 2, 3, 4, 5, 6, 7, 8, and/or 9, wherein the processor is further configured to vary the width of at least one of the first and second neural networks during training based on the first and second subbands.

In an example 11, an artificial neural network method includes the steps of receiving input data that defines a pattern to be recognized, decomposing the input data into a first subband and a second subband, wherein the first and second subbands include different characterizing features of the pattern in the input data, and feeding the first and second subbands into first and second neural networks being trained to recognize the pattern.

An example 12 includes the subject matter of example 11, wherein the input data is decomposed based on frequency.

An example 13 includes the subject matter of example 11 and/or 12, wherein the input data is decomposed using at least one of a low-pass filter, a high-pass filter, a Laplacian filter, a Gaussian filter, and a Gabor filter.

An example 14 includes the subject matter of example 11, 12, and/or 13, further including the step of varying bit precision of the first and second neural networks during training based on the first and second subbands.

An example 15 includes the subject matter of example 11, 12, 13, and/or 14, further including the step of fusing the first and second neural networks trained on the first and second subbands.

An example 16 includes the subject matter of example 11, 12, 13, 14, and/or 15, further including the step of feeding the fused neural network into a subsequent hidden layer of at least one of the first and second neural networks.

An example 17 includes the subject matter of example 11, 12, 13, 14, 15, and/or 16, further including the step of feeding the first and second neural networks trained on the first and second subbands into a subsequent hidden layer of at least one of the first and second neural networks.

An example 18 includes the subject matter of example 11, 12, 13, 14, 15, 16, and/or 17, wherein the fused neural network comprises a weighted average of the output of the first and second neural networks.

An example 19 includes the subject matter of example 11, 12, 13, 14, 15, 16, 17, and/or 18, further including the step of varying width of the neural network during training based on the first and second subbands.

An example 20 includes the subject matter of example 11, 12, 13, 14, 15, 16, 17, 18, and/or 19, wherein the input data is decomposed into first, second, and third subbands, and wherein the method further includes the step of removing an element of the neural network based on a substantially zero weight contribution to at least one of the first, second, and third subbands.

The invention claimed is:

1. An artificial neural network system implemented by one or more computers, the artificial neural network system being configured to:
    receive input data that defines a pattern to be recognized;
    decompose the input data into a first subband and a second subband, wherein the first subband and the second subband include different characterizing features of the pattern in the input data; and
    feed the first subband and not the second subband into a first neural network and feed the second subband and not the first subband into a second neural network, the first neural network and the second neural network being trained to recognize the pattern, wherein the first neural network is different from the second neural network.

2. The system of claim 1, wherein the system is configured to decompose the input data based on frequency.

3. The system of claim 1, wherein the input data is decomposed using at least one of a low-pass filter, a high-pass filter, a Laplacian filter, a Gaussian filter, and a Gabor filter.

4. The system of claim 1, wherein the system is further configured to adjust bit precision of the first and second neural networks during training based on the first and second subbands.

5. The system of claim 1, wherein the system is further configured to fuse the first neural network being trained on the first subband and the second neural network being trained on the second subband.

6. The system of claim 5, wherein the system is further configured to feed the fused neural network into a subsequent hidden layer of at least one of the first neural network and the second neural network.

7. The system of claim 5, wherein the fused neural network comprises a weighted average of the output of the first neural network and the second neural network.

8. The system of claim 1, wherein the system is further configured to feed the first neural network trained on the first subband and the second neural network trained on the second subband into a subsequent hidden layer of at least one of the first neural network and the second neural network.

9. The system of claim 1, wherein the pattern is a phoneme, and the first subband and the second subband characterize at least one of frequency and pitch.

10. The system of claim 1, wherein the system is further configured to vary a width of at least one of the first neural network during training based on the first subband and the second neural network during training based on the second subband.

11. An artificial neural network method including the steps of:
    receiving input data that defines a pattern to be recognized;
    decomposing the input data into a first subband and a second subband, wherein the first subband and the second subband include different characterizing features of the pattern in the input data;
    applying a first weight to the first subband and a second weight to the second subband, wherein the first weight is different from the second weight; and
    feeding the first subband and not the second subband into a first neural network and feeding the second subband and not the first subband into a second neural network, the first neural network and the second neural network being trained to recognize the pattern, wherein the first neural network is different from the second neural network.

12. The method of claim 11, wherein the input data is decomposed based on frequency.

13. The method of claim 11, wherein the input data is decomposed using at least one of a low-pass filter, a high-pass filter, a Laplacian filter, a Gaussian filter, and a Gabor filter.

14. The method of claim 11, further including the step of varying bit precision of the first and second neural networks during training based on the first and second subbands.

15. The method of claim 11, further including the step of fusing the first neural network trained on the first subband and the second neural network being trained on the second subband trained on the second subband.

16. The method of claim 15, wherein the fused neural network comprises a weighted average of the output of the first neural network and the second neural network.

17. The method of claim 11, further including the step of varying a width of at least one of the first neural network during training based on the first subband and the second neural network during training based on the second subband.

18. The method of claim 11,
    wherein the input data is decomposed into the first subband, the second subband, and a third subband, and
    wherein the method further comprises removing an element of at least one of the first neural network and the second neural network based on a substantially zero weight contribution of at least one of the first subband, the second subband, and the third subband.

19. A non-transitory, computer-readable medium comprising instructions that, when executed, are configured to cause processing circuitry of an artificial neural network system to
    receive input data that defines a pattern to be recognized;
    decompose the input data into a first subband and a second subband, wherein the first subband and the second subband include different characterizing features of the pattern in the input data;
    apply a first weight to the first subband and a second weight to the second subband, wherein the first weight is different from the second weight; and
    feed the first subband and not the second subband into a first neural network and feed the second subband and not the first subband into a second neural network, the first neural network and the second neural network being trained to recognize the pattern, wherein the first neural network is different from the second neural network.

20. The system of claim 1, wherein the system is further configured to apply a first weight to the first subband and a second weight to the second subband, wherein the first weight is different from the second weight.

* * * * *